US008310127B2

(12) United States Patent
Hagg

(10) Patent No.: US 8,310,127 B2
(45) Date of Patent: Nov. 13, 2012

(54) CONNECTED ENERGY CONVERTER, GENERATOR PROVIDED THEREWITH AND METHOD FOR THE MANUFACTURE THEREOF

(75) Inventor: Franklin Hagg, Alkmaar (NL)

(73) Assignee: Innovy, Alkmaar (NL)

( * ) Notice: Subject to any disclaimer, the term of this patent is extended or adjusted under 35 U.S.C. 154(b) by 429 days.

(21) Appl. No.: 12/515,797

(22) PCT Filed: Nov. 21, 2007

(86) PCT No.: PCT/NL2007/000289

§ 371 (c)(1), (2), (4) Date: May 21, 2009

(87) PCT Pub. No.: WO2008/063052

PCT Pub. Date: May 29, 2008

(65) Prior Publication Data

US 2010/0019619 A1 Jan. 28, 2010

(30) Foreign Application Priority Data

Nov. 21, 2006 (NL) ...................................... 1032911

(51) Int. Cl.
*H02N 3/00* (2006.01)

(52) U.S. Cl. ........................................................ 310/306

(58) Field of Classification Search .................. 310/306; 136/200, 206; 322/2 R
See application file for complete search history.

(56) References Cited

U.S. PATENT DOCUMENTS

| | | | | |
|---|---|---|---|---|
| 3,189,765 | A | 6/1965 | Danko et al. | |
| 3,432,690 | A | 3/1969 | Blume | |
| 3,548,222 | A | 12/1970 | Hobson | |
| 3,702,408 | A | 11/1972 | Longsderff et al. | |
| 4,368,416 | A * | 1/1983 | James | 322/2 R |
| 6,307,697 | B1 | 10/2001 | Chainer et al. | |
| 6,313,391 | B1 * | 11/2001 | Abbott | 136/200 |
| 6,411,007 | B1 | 6/2002 | King et al. | |
| 7,427,786 | B1 * | 9/2008 | Cox | 257/121 |
| 2004/0189141 | A1 * | 9/2004 | Tavkhelidze et al. | 310/306 |
| 2005/0104512 | A1 * | 5/2005 | Tavkhelidze et al. | 313/506 |

* cited by examiner

*Primary Examiner* — Quyen Leung
*Assistant Examiner* — Eric Johnson
(74) *Attorney, Agent, or Firm* — Hoffmann & Baron, LLP

(57) ABSTRACT

A high-output energy converter of an output-improving thermionic generator, thermally connected to other generators without moving parts that utilize the residual energy from the thermionic generator. The thermionic generator comprises a rcultilayered vacuum diode, the layers of which are very thin and the gaps between the layers are also thin and kept at a distance from one another by selectively flexible spacer elements. Piezo elements or heating elements can precisely adjust the height of the gaps.

35 Claims, 9 Drawing Sheets

CONNECTED ENERGY CONVERTER, GENERATOR PROVIDED THEREWITH AND METHOD FOR THE MANUFACTURE THEREOF

CROSS-REFERENCE TO RELATED APPLICATIONS

This application is the National Stage of International Application No. PCT/NL2007/000289, filed Nov. 21, 2007, which claims the benefit of Netherlands Application No. 1032911, filed Nov. 21, 2006, the contents of which is incorporated by reference herein.

FIELD OF THE INVENTION

The present invention relates to a connected energy converter, to a generator provided with an energy converter of this type and to a method for the use thereof.

The energy converter is suitable for converting thermal energy into electricity. The converter is, in particular, suitable for converting heat into electrical energy by means of a combination of connected generators without moving parts.

BACKGROUND OF THE INVENTION

Generators without moving parts include, for example, a thermionic generator (TIG), a thermoelectric generator (TEG), a thermophotovoltaic generator (TPV) and/or a thermotunnel generator (TTG). The connection of generators can, for example, serve as a source of electrical energy.

A TIG comprises a diode having two electrodes, one of which is called the emitter and the other the collector, with therebetween a slotted gap which is a vacuum or which is filled with an ionisable gas. In order to become detached from the surface of the emitter, electrons have first to overcome a threshold tension known as the operating function of the electrode material. Owing to the magnitude of the operating function, electrons become detached from the emitter only at relatively high temperatures. The detached electrons are conveyed to the collector as a result of the fact that heat, in this case the kinetic energy of the electrons or ions, flows from the warm emitter to the colder collector. The electric charge of the electrons also produces an electric current.

However, as a result of the fact that the thermionic effect is effective only at temperatures above approximately 1,600 K, a large amount of radiation and conduction heat is also conveyed from the emitter to the collector and relatively high heat loss occurs. The maximum output obtained is thus 10 to 13%, and this is uneconomic for most applications. The use of the known converter is thus restricted to space travel and to applications in which a relatively low weight and long reliable availability are of crucial importance. If a multilayered TIG is used, the collector of one layer is connected to the emitter of the following layer, these connected electrodes forming a single entity.

A TEG comprises thermocouples made of "n" and "p"-doped semiconductor material, wherein an electric current flows in the "p" leg with the heat and in the "n" leg counter to the heat flow according to the Seebeck effect, and operates at temperatures of between 0 and 600 degrees Celsius and has outputs of up to 15%.

A TPV comprises a single-layered or multilayered diode which converts infrared radiation, emitted by a heat radiation emitter brought to high temperature, into an electric current. TPVs have, including the conversion output of the radiation emitter, outputs of up to 21% in the case of conversion of, for example, solar energy. In the case of the conversion of heat from a burner, outputs of up to 12% are obtained, provided that the residual heat in the outlet gases is recovered by a recuperator which preheats the inlet gases from the burner therewith.

A TTG operates like a TIG but can, owing to the tunnel effect, generate an electric current even at low temperatures of between 0 and 800° C. according to the thermionic effect. A TTG can obtain outputs of up to 40%.

One embodiment of a TPV is a micron-gap TPV (MTPV). The MTPV is irradiated by the heat radiation emitter at a very small distance of approx. 100 nm, whereas the space therebetween is evacuated. As a result of the narrow space, radiation resonance occurs and a higher total output of 30% is obtained, although lower radiation emitter temperatures from 1,000 to 1,200 K can also be utilised.

The TEG and the TTG operate at lower temperatures and can thus even more effectively be preceded by a TIG, increasing the common output above the outputs of the individual generators.

Research is being conducted into increasing the output of a TEG and it is expected that the current outputs of 15% can be increased to 30%. However, the TIG currently has outputs of 13% and should be able to operate much more effectively as a connected component. Theoretically, it is expected that the output of a TIG should be able to increase to 40%. However, at present, the TIG has a large number of drawbacks.

A major drawback of the TIG is the heat radiation between the electrodes, which cannot be converted into electrical energy. Solutions to the above-mentioned problem include, for example, the use of other emitters which are able to cope with higher energy density. This reduces the losses of heat radiation. Other possibilities include the use of a plurality of diodes, reducing the difference in temperature per layer and thus also the radiation losses.

Another major drawback of the TIG results from the fact that caesium gas is used in the gap to lower the operating function. The caesium gas is necessary to obtain a sufficiently high power density. The use of caesium gas gives rise to internal heat losses and current losses. The caesium is not necessary if the operating function is lowered in different ways, for example by the use of a thinner and subsequently thermally evacuated gap of from 100 to 2,000 nm, the use of a nanostructure comprising cones and/or grooves having a height of from 5 to 200 nm and the use of semiconductors.

The designing of a lower operating function also allows electrons to be emitted at lower temperatures (1,000-1,400 K). This allows a plurality of TIGs to be connected at lower intermediate temperatures and the above-mentioned radiation losses to be further reduced.

Another major drawback is the heat losses of electrons having higher energy than the electrical potential energy between the emitter and the collector and the plurality of heat conversions. Even reflective electrons which transfer their heat but not their charge give rise to losses. Known TIGs are cylindrical and/or dome-shaped. Thermal expansion makes it difficult to provide these TIGs with a plurality of layers. For a good output, the gap between each layer has to be precisely adjusted, as does the distance between the TIG and the generators connected to the TIG without moving components. However, all of these improvements to increase the output require the slot height of the gaps to be adjusted with uniform precision, and this cannot be achieved or is hardly achievable with the current embodiments.

When used in space travel, the energy converter is started up once and it is possible to eliminate temperature stresses which are produced. A larger market for energy converters without moving parts is the use of portable power supplies for replacing batteries. On account of the high energy content of the fuels such as diesel, these energy converters can, depending on the output, be 2 to 10 times lighter than conventional batteries. However, for this application, the converter has to be able to start and stop frequently, and alternating thermal stresses can be fatal owing to fatigue, cracking, in the case of fixed connections, and wear caused by, inter alia, seizing, in the case of sliding connections. This impairs electrical and thermal contacts, as a result of which the output deteriorates while the service life is limited. In this large market and in the future, once the anticipated high outputs have been achieved, even larger markets such as haulage and solar energy, the energy converter will have to be able to start and stop frequently, and this is not readily possible in the current coupled and connected generators and the aimed-for improved generators, owing to alternating internal mechanical stresses and wear in the event of possible friction between the connected generators.

Connecting various generators allows the output to be increased if the generators are operative in a temperature range which is different for each generator but nevertheless optimal. The subsequent generator then still converts the residual energy from the preceding generator into electrical energy.

In the case of generators comprising moving parts, this method has already been utilised. Examples include a gas turbine which operates at high temperature and precedes a current turbine operating at a lower temperature. The common output of this "'STEG'" unit is 60%, whereas the individual outputs of the turbine generators are between 30 and 40%.

A known converter comprising a connected combination of generators without moving parts comprises a TEG with a TPV, the heat being generated by combustion. The residual heat from the outlet is then converted by the TEG into electrical energy. As a result of the fact that the process is not much more cost-effective than the recovery of heat using an inexpensive recuperator, the output is increased—at much higher cost—by just 12% to 14%. A problem of the TPV is that the radiation emitter thereof operates at a high temperature of approx. 1,500° C. and that the TPV operates at a low temperature of from 25-50° C. No other generator can be connected between the radiation emitter and the TPV, and there are few possibilities for increasing the output by connecting to other generators. A converter comprising a TPV converts sunlight, which has first been concentrated, into heat by allowing the light to radiate onto a combined absorber/emitter. Subsequently, the radiation heat is converted by a TPV into electrical energy. The absorber/emitter is heated in this case on the sun side by absorbing the light and radiates on the TPV side heat radiation to the TPV. The problem of the absorber/emitter is that the emitter temperature drops as the sunlight diminishes. At a lower temperature, the radiation decreases but the wavelength also shifts to an area where the TPV is less sensitive, so the output decreases.

In other known converters, a thermionic generator (TIG) and a TEG are joined together, wherein the residual heat from the TIG, which has a temperature of approximately 900 K, can beneficially be used by the TEG, as may be found, inter alia, in U.S. Pat. No. 3,189,765. Problems with this include the fact that, as a result of the difference in thermal expansion, the TIG and the TEG make poor thermal contact owing to mechanical instability, such as wear and cracking, and the components can break down as a result of fatigue stresses if the connected generators are started up and stopped frequently. It is expected that the output will after just a few start-ups have deteriorated by 10% and will subsequently drop by 50%.

In other known converters, a multiplicity of TIG elements are connected electrically in series to generate higher electric tensions and lower currents, and these reduce the internal and external electrical losses, as may be found, inter alia, in U.S. Pat. Nos. 6,037,697, 3,432,690. In this case, electrical contact is established between the hot emitter of one TIG element and the relatively cold collector of the following TIG element. In the case of the known converters, the short distance gives rise to large heat losses and high fatigue stresses in the electrical connections between the TIG elements. On account of the short distance, thermal losses will lower the output by 10% and, after a plurality of start-ups, fatigue stresses will further impair the output by 20 to 30%.

In the case of gaps having a slot height of less than approximately 1 micrometer, caesium gas is no longer required and the losses of the TIG are somewhat lower. U.S. Pat. No. 6,411,007 and other documents utilise this by producing a TIG made by chemical vapour deposition (CVD). The small slot height of the gap is in this case maintained by spacer elements, the length of which corresponds to the slot height of the gap. These elements produce in this case temperature gradients of from approximately $10^8$-$10^9$ K/m. Problems stemming from this include high thermal losses in the spacer elements and high fatigue stresses in the generators during starting and stopping. As a result of the high thermal losses, the output deteriorates by 20-40% and will deteriorate by 30-70% after a plurality of start-ups.

SUMMARY OF THE INVENTION

The object of the present invention is to provide a selectively flexibly connected converter of the above-mentioned type by keeping the slot height of the gap between the electrodes of the TIG and the connected generators constant and allowing deformations in other directions, thus providing a better output, better mechanical stability and a longer service life during the frequent starting and stopping of the selectively flexibly connected generators.

For this purpose, the present invention provides an energy converter for converting heat into electrical energy, comprising:

a combination of a thermionic generator (TIG), selectively flexibly connected to one or more other generators without moving parts that, being selectively flexibly connected, obtain a higher output than each generator separately.

The generators are joined together directly and in a selectively flexible manner, without the interposition of a heat exchanger or heat pipe, as the collector of the TIG is part of these generators. The residual heat which is left over once the TIG has generated electricity is immediately used by the generator(s) connected to the TIG in a selectively flexible manner. In order to counteract thermal stresses, the connection between the generators (TIG, TEG and others) and between the electrodes of the TIG is configured resiliently and selectively flexibly, so the connected components can freely expand and the required distance between the components is maintained. This resilience is produced by connecting the components to one another using slim, columnar spacer elements and/or by providing the components with selectively flexible grooves. For correct flexibility, wherein the thermal deformation stresses remain admissible, the spacer elements should be longer than the slot height of the gap between the electrodes of the TIG. For this purpose, the generator (TEG or other) connected to the TIG is provided with (blind) holes in which the spacer elements can be sunk and positioned. The spacer elements are connected on one side to the emitter(s) of the TIG and on the other side, at the end of the (blind) holes, to the generator connected to the TIG. In the case of a TIG which may be multilayered, holes are also formed in the intermediate electrodes to allow the spacer elements of the outside electrodes to pass contactlessly to the (blind) holes of the generator connected to the TIG. As a slim, columnar spacer element is able to bend in a laterally selectively flexible manner, the electrodes of the TIG and the generators connected to the TIG are able to expand freely with low material stresses, whereas the spacer element is rigid in the axial direction and, as such, is able to keep the required slot height of the gap between the emitter(s) and collector(s) constant within the required margins. By providing optionally the emitter(s) and optionally the collector(s) with selectively flexible grooves, the emitters can also follow deformations of the connected generator and the material stresses can be reduced still further, while in this case too the axially rigid spacer elements keep the distance between the electrodes, and thus the slot height of the gap, constant.

As a result of the fact that the outer collector of the TIG is part of the selectively flexibly connected generator (TEG or other), the actual connection between the TIG and the connected generator is produced with the spacer elements between the emitter(s) of the TIG and the connected generator, and there result no high fatigue stresses and poor thermal contacts in the connection between the TIG and the connected generator, which, on account of the output, has to be thermally very good.

On account of the output, the thermal conductivity in the spacer elements themselves should be as low as possible, because the heat must as far as possible be used by the TIG for the thermionic effect and may not pass through the spacer elements. A second advantage of the relatively long and slim spacer elements is therefore that the thermal conductivity is poor and as little heat as possible is lost through the spacer elements. The spacer elements are therefore preferably made of material having poor thermal conductivity. In the case of the present invention, on account of the slim spacer elements, the cross section through which parasitic losses can flow is approximately just 0.05% of the total cross section of the TIG and the length of the spacer elements is approximately 10 to 20 times the height of the gap between the electrodes of the TIG, and thus also between the connection with the connected generator. For a desired slot height of 1 micrometer, the heat losses are Q, with a typical cross section of the spacer elements $A_a$=0.0001 $cm^2$, a typical difference in temperature ΔT=600 K, a typical conductivity λ=1 W/Km, a typical slot height s=1 μm and the number of times n=10 that the spacer elements are longer than the slot height:

$$Q=A\,\Delta T\,\lambda/(n\,s)=0.0005\times10^{-4}\times600\times1/(20\times0.000001)=1.5\ W/cm^2$$

For a typical heat input from a TIG of 100 W/$cm^2$, the losses through the spacer elements of the present invention are therefore 1.5/101.5=approximately 1.5%.

In the case of the known embodiment of U.S. Pat. No. 6,411,007, n=2 and the cross section of the spacer elements is 0.2% of the total cross section, so the parasitic losses thereof are:

$$Q=A\,\Delta T\,\lambda/(n\,s)=0.002\times10^{-4}\times600\times1/(2\times0.000001)=60\ W/cm^2$$

For a typical heat input of 100 W/$cm^2$, the losses in U.S. Pat. No. 6,411,007 are somewhat greater: 60/160=38%.

A third advantage of the spacer elements is that they can also conduct the electric current which has to be discharged by the outer emitter. For this purpose, some of the spacer elements are provided with an electrically conductive layer which, on account of the output, preferably has good electrical conductivity and poor thermal conductivity and in which the outside of the element is electrically insulating. The electrically conductive layer is for this purpose electrically connected on one side to the outer emitter and on the other side to a conductive wire which is connected to the subsequent collector or to the electrical control circuit of the energy converter. On account of this application, the electrical connections are also selectively flexible and high fatigue stresses and poor electrical contacts cannot occur in this case either.

The direct selectively flexible connection of the generator includes, for example, the outer collector of the thermionic generator (TIG) which also forms a portion of the warm side of a TEG, (M)TPV, TTG connected thereto, or other converter without moving parts.

A Power TEG, as developed and patented by the Applicant, is a TTG and, for example, suitable as a component of a connected converter. The Power TEG is a high-output, thermionic energy converter comprising a multilayered vacuum diode, the layers of which are very thin and the gaps between the layers are a few nanometers thick. The layers are kept at a distance from one another by attaching insulator elements embedded in the layers. On the cold side, the distance between the layers should be so small that the current thereby thermionically generated is amplified by the tunnelling of electrons from layer to layer.

In one embodiment, the invention provides an improved TIG comprising:

- a number of electrodes having surfaces attached at an optimum gap with respect to one another;
- emitters provided with a specific optimum surface structure;
- an emitter and collector comprising a material having a specific optimum operating function;
- a number of spacer elements attached between the electrodes for forming and adjusting the gap, the spacer elements being sufficiently long and thin to restrict thermal losses and to allow thermal expansion of the electrodes and the connected generators to be carried out in a selectively flexible manner with low material stresses;
- the gap being sufficiently small and precise to obtain an optimum output;
- the spacer elements mechanically connecting the various electrodes to an underlying substrate; and/or
- a plurality of electrodes stacked in series and gaps which, for each layer, are configured as optimally as possible, in terms of partial output and total output, in accordance with the operationally prevailing local temperature, the desired energy density and the desired or actual electrical potential.

In the case of the present invention, the partial surfaces to be monitored are markedly smaller on account of the freedom of electrodes connected loosely to one another. The electrodes are kept at a monitorable distance from one another by the spacer elements. Optionally, the distance can be adjusted even more precisely by regulating the distance interactively using piezo elements positioned between the spacer elements and the substrate or the generator connected to the TIG. It is also possible to adjust to the distance more precisely by regulating the temperature of the spacer elements using an electric current flowing through an electrical resistance layer attached to the spacer elements in such a way that the spacer element expands to the desired length.

The TIG, which according to the present invention has resilient electrode plates and adjustable, laterally resilient and axially rigid spacer elements, can accurately be provided, without the burden of inadmissible deformation stresses, with a plurality of layers and relatively small gaps which are to be adjusted accurately. As a result of the use of a plurality of layers of electrodes, the differences in temperature between the mutual layers are reduced, and radiation losses are markedly reduced and the output of the energy converter increased. Optionally, the electrodes are also provided with a spectrally selective layer which reduces the emission coefficient.

In one embodiment, for lowering the operative function of the emitter material to the optimum value, caesium vapour is introduced into the gap, allowing the temperature of the emitter to be reduced. This is also more beneficial for the materials used and the service life. Semiconductors can also be used to lower the operative function.

Preferably, the electrodes comprise elements or plates which are connected, optionally resiliently, substantially parallel to the slotted gap or are able to move entirely freely relative to one another in order to minimise temperature stresses. The movement of the plates of the electrodes is, for example, possible as a result of grooves which are formed in the electrodes and around which the electrodes are able to bend along with the environment, so the slot height of the gaps can remain constant. The electrodes of, for example, a thermionic generator are thus capable of following irregularities and thermal deformations of the surface of a generator connected thereto and also deformations of the plates relative to one another. The occurrence of high stresses is thus prevented, while the heights of the slots or gaps remain in all cases at the adjusted and desired values. As a result of the more constant height of the gap at the adjusted and desired value, the output is better.

As a result of this freedom of movement, the electrode plates can also move freely perpendicularly to the direction of the plate, where they can also more easily maintain the slot height of the gap. In this case, the electrodes are connected on one side to the spacer elements. As a result, the height of the gap can be less than 100 nm.

For optimum cooling, the substrate is provided internally with hollow spaces which are connected to feed and discharge pipes with vacuum-tightness from approximately $10^{-5}$ to $10^{-7}$ torrl/s. In these hollow spaces, the substrate is brought into direct contact with a coolant, or a coolant evaporating on the surface (heat pipe).

In one embodiment, there prevails in the gaps of the TIG a thermal vacuum in order also to restrict the heat loss by convection in the gaps. The energy converter is therefore attached in a vacuum-tight housing. The walls of the housing remain at ambient temperature. The walls also reflect the heat radiation which may still emanate from the converter comprising a reflecting layer. The housing is also connected to the cold substrate in a vacuum-tight manner.

In one embodiment, the emitter of the TIG is provided with a spectrally selective layer which emits less heat radiation. Examples of a selective layer include erbium and ytterbium and the use of photonic crystals. In another solution, the collector is provided with a reflective layer which returns the lost radiation to the emitter. Examples of a reflective layer include gold, conductive oxides (TCO) and also photonic crystals as dielectric mirrors of, for example, TCO.

In one embodiment, the radiation losses in the TIG are restricted by also stacking a plurality of diodes one on top of another and precisely adapting, for each layer, the correct geometry, as the size of the gap, the height of the nanostructure and the operating function of the (doped semi)conductor materials, to the prevailing temperature, desired or actual electrical potential and energy density. Together, these provide the desired optimum output.

In one embodiment, concentrated sunlight is radiated directly onto the converter by making a portion of the wall of the housing transparent (cold window). The cold window preferably comprises dehydrated quartz. In order to restrict reflection, the cold window is kept as small as possible by attaching the window at the focal point of the solar concentrator and/or by using as high a concentration as possible (6,000 to 8,000 suns).

In one embodiment, the energy converter is heated by a burner which is also attached in the vacuum space. The burner heats in this case a heat radiation emitter which radiates heat onto the energy converter in a contactless manner. As a result, the burner cannot transfer mechanical loads to the converter and mechanically disturb the precisely adjusted converter. The walls of the burner are also vacuum-tight and connected to the surrounding housing of the energy converter in a vacuum-tight manner. The walls are in this case relatively thin and made of a material having poor thermal conductivity (coefficient of conductivity21 15 W/Km). Optionally, the walls are provided with a layer which reflects heat radiation. The burner is provided with a recuperator wherein, as a result of the design, the temperature gradient of the gases to be recuperated is selected in such a way that the recuperator allows as few parasitic heat losses as possible to pass outward from the burner.

In one embodiment, a cold window is integrated in the recuperator. Concentrated sunlight is thus able to shine on the heat radiation emitter, so the heat radiation emitter is at the same time heated by the burner and by concentrated sunlight. The cold window may also be an opening, the undesirable outward leakage of gas being prevented by introducing a small portion of the inlet air into the opening in a pressure-equalising manner, as what is known as an air curtain. The recuperator can also be made partially transparent, for the portion in which the concentrated light beam intersects the recuperator.

By heating, in accordance with the present invention, the absorber/emitter simultaneously with a burner and with concentrated sunlight, the absorber/emitter can be kept at that temperature at which the output of the irradiated TPV is optimal. As a result, in the case of the present invention, the output is optimal for each sun strength and the sun is optimally utilised at all times. This also applies to other connected energy converters according to the present invention.

In one embodiment, an MTPV operating at a lower temperature, preferably lower than 900° C., is connected to a TIG in order to increase the output.

In one embodiment, the heat radiation emitter of the MTPV is also used as an emitter of thermionically emitted electrons and the electrode, facing the (heat radiation) emitter, of the MTPV is used as a collector of these electrons. The material of the heat radiation emitter is in this case a semiconductor, provided with a nanostructure.

In contrast to a TEG, in which the current contacts are both attached to the cold side, the current of a TIG should be taken both from the warm and from the cold side of a diode or electrode forming part of the TIG.

The electrical conductor to the warm side accordingly provides additional losses and is preferably heat-resistant with thermal insulation and good electrical conductivity. Preferred as a current conductor is cobalt having a combined thermal/electric loss of approximately 8.5%. Also possible is the use of chromium or molybdenum which is able to resist elevated temperature. At very high temperatures, use may be made of tungsten having a loss of 12.5%. In order to minimise losses, the spacer elements of the outer emitter of the multilayered TIG are also used to convey this current.

At high temperatures (>1,500 K), electrode material preferably comprises molybdenum, tantalum, tungsten or semiconductors. Suitable semiconductors include, for example, zirconium oxide and/or metal silicides such as molybdenum disulphide or other high-temperature ceramic semiconductors. Optionally, the semiconductors are doped with other elements in order to influence the conductivity and the operative function and to bring them to the optimum value for each layer.

The isolation elements used are preferably aluminium oxide, magnesium oxide, quartz or other non-conductive, high-temperature ceramic materials such as carbides and nitrides.

At low temperatures, a broad range of conductors and semiconductors are possible and a broad range of insulating materials are possible. The choice is determined by stability, costs, coefficient of expansion and weldability and the counteracting of cold-welding, if this is desirable on account of detachment during manufacture.

According to a further aspect, the present invention provides a method for manufacturing an energy converter, including the following steps:

providing a number of electrodes having surfaces;

attaching a number of spacer elements between the surfaces of the electrodes so as to form a gap, the height of the gap being sufficiently small and constant to allow optimum output of the TIG;

the insulator elements and live elements providing the mechanical connection to a substrate.

For carrying out the invention, various embodiments are possible, of which a combination of a TIG with a TEG, a TTG and/or MTPV are preferable. The TEG, TTG and/or MTPV are used as a substrate or else fastened to a substrate and then provided with holes, as a result of which the spacer elements can be fastened to the substrate through the connected generators.

In a preferred embodiment, the TIG is connected to a TTG (Power TEG): both have roughly the same design and roughly the same operation whereas, by contrast, the TIG operates optimally at temperatures higher than 900 K and the TTG at temperatures lower than 900 K. The connection of the TIG to the TEG and/or (M)TPV is also advantageous on account of the mutually optimum operation in various temperature ranges. Although the manner of conversion of the latter generators is different, the flat shape of these generators is suitable for connecting them directly to the TIG.

In order to reduce parasitic losses, a vacuum-tight housing is attached to the cooled substrate, around the generators. The inner surfaces of the housing are provided with a reflective layer which reflects the heat radiation from the enclosed components as much as possible.

Subsequently, a burner comprising a radiation emitter is attached in the housing of the energy converter. Electrical contacts and wiring of the piezo elements or the temperature regulators of the spacer elements are also attached in the housing. The piezo elements, which are attached between the spacer elements and the substrate, or the temperature-regulated spacer elements allow the height of the various gaps to be monitored and regulated, by feedback of the electric current and/or tension over the generators. Optionally, the current density can also be distributed locally and uniformly over the surface of the electrodes with a regulator. The distance is also to be adjusted once by calibrating in advance to the correct value the distance, and thus the current, mechanically using wedges or other mechanisms. These mechanisms are in this case positioned permanently between the spacer elements and the substrate. After manufacture, for each spacer element, each adjustment mechanism is then adjusted manually or automatically during calibration and testing in such a way that the correct predetermined optimum electric current is adjusted, for a predetermined tension, by a calibrated load connected to the energy converter.

BRIEF DESCRIPTION OF THE DRAWINGS

Further advantages and features of the present invention will be illustrated with reference to the appended figures, in which.

DETAILED DESCRIPTION OF PREFERRED EMBODIMENTS

Figure 1:
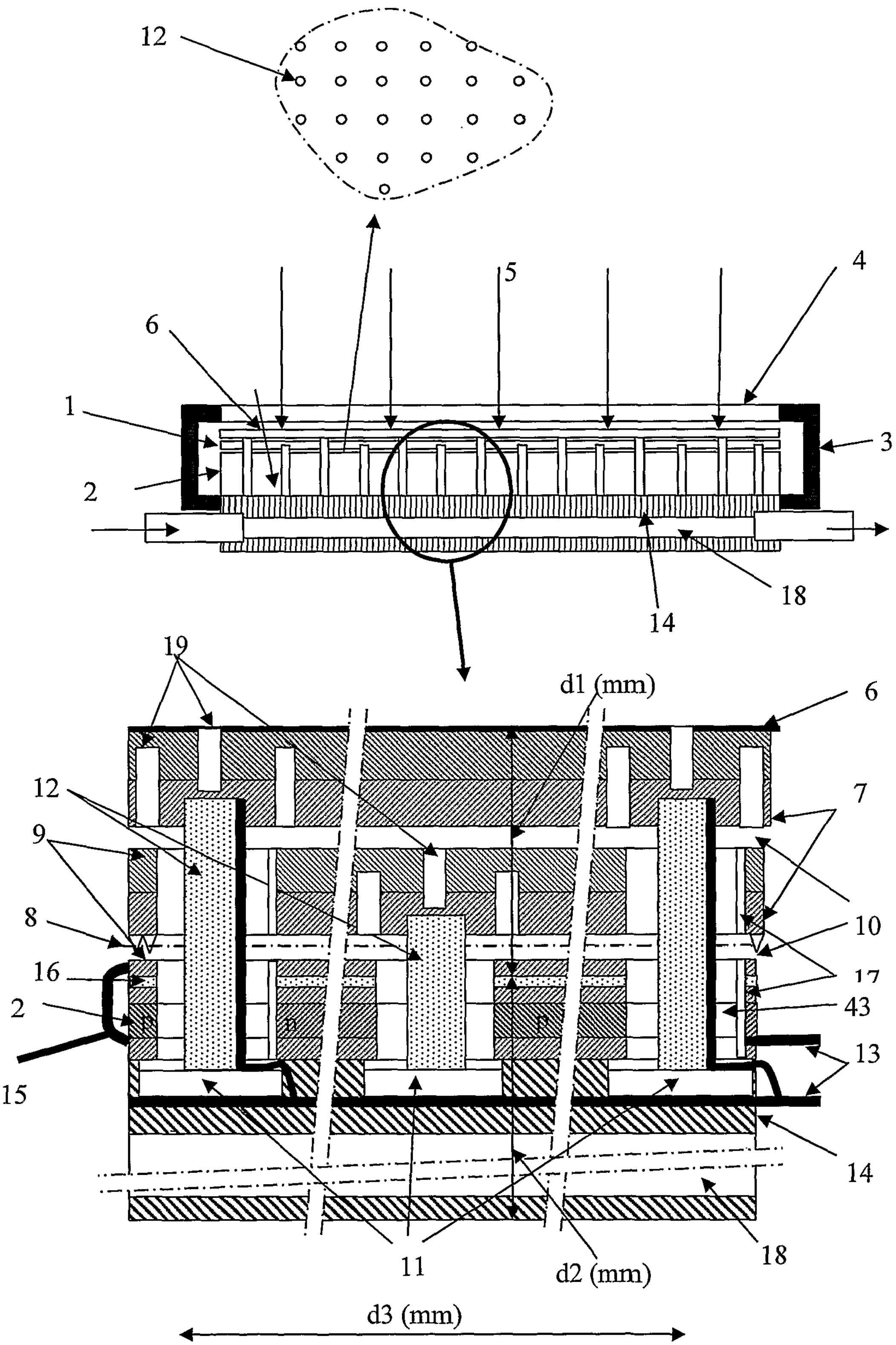
FIG. 1 is a schematic cross section of a detail of a first embodiment of an energy converter according to the present invention.

Identical parts will be denoted hereinafter by the same reference numerals.

FIG. 1 shows an embodiment of an energy converter of a multilayered TIG 1 connected to a TEG 2 in an evacuated space 3 having a cold window 4.

Through the cold window 4, there is radiated concentrated sunlight 5 which heats an absorber 6 on the outer emitter 7 to a temperature of from 1,400 to 2,000 K. Of the multilayered TIG, two of the possible plurality of layers are shown. The emitters 7 of the layers are optionally doped with, for example, erbium in order to reduce heat radiation losses and are optionally provided with a microstructure 8 having a height of from ten to five hundred nm in order to intensify the thermionic emission.

The collectors 9 are optionally provided with a reflective layer to reflect heat radiation. The reflective layer preferably comprises, at temperatures higher than 800 K, an electrically conductive oxide (TOC) and, at temperatures lower than 800 K, a thin layer of gold. The thickness of the layers to which the electrodes 7 and/or 9 are attached is from one to ten micrometers and the height of the gaps 10 is from approximately 0.5 to 100 micrometers.

Grooves 19 are optionally formed in the plates comprising electrodes 7 and/or 9 in order to make the plates more resilient, thus reducing the forces acting on the spacer elements 12 during thermal deformations. The height of the gaps is optionally adjustable using piezo elements 11, by adjusting spacer elements 12 which set the layers apart.

In order to avoid heat loss, the columnar spacer elements 12 are thin and dependent on the height of the gaps between the electrodes having a diameter of from two to 100 micrometers thick. The spacer elements 12 of the outer emitter 7 are provided with a layer 43 which has good electrical conductivity and preferably poor heat conductivity and is resistant to high temperatures. The layer is, for example, made of molybdenum.

The layers 43 conduct the generated current from the TIG to the current supply wires 13 and are embedded in the substrate 14 in an insulated manner. The remaining spacer elements 12 are preferably made only of a material having poor conductivity, such as oxides.

The live layers 43 are preferably connected to the emitter 7 by spot welding or by diffusion welding. On the other side, the live layers 43 are resiliently soldered or welded to the supply wires 13 and the spacer elements 12 are securely bonded or sintered to the piezo elements 11.

The insulating spacer elements are preferably connected to the remaining emitters 7 in a mortise and tenon joint by means of sintering or clamping. On the other side, the insulating spacer elements are bonded or sintered to the piezo elements 11.

The spacer elements 12 are set apart from one another by from 0.5 to 2 mm. Of each layer comprising electrodes 7 and/or 9, the height of the gap 10, the material of the electrodes 7 and/or 9 and the height of the microstructure 8 are adjusted in such a way that the output of the TIG 1 is optimal at the prevailing operational temperature. In this case, it is important that the electric current passing through the electrodes is the same in each layer.

The current of the TIG 1 is discharged at the outer collector 9, optionally combined with the current discharge or supply means 15 of the TEG 2. An electrically insulating layer 16 of the outer collector 9 of the TIG is electrically separated from the hot side of the TEG 2. However, the material is selected in such a way that the thermal contact and transfer of heat are good.

Formed in the electrodes 7 and/or 9 and the TEG 2 are holes through which the spacer elements 12 of the outside layers 7 and/or 9 protrude. If the spacer elements are live, the holes are then provided with an insulation layer 17. The insulation layer 17 is, for example, obtained by oxidation or by an attached oxide. The holes are sufficiently large to allow space for expansion of the layers relative to one another. The relatively small holes in the electrodes 7 and/or 9 are formed by etching or using a laser. The larger holes in the TEG 2 are formed by drilling or using a laser. If the TEG is too thick to be able to drill holes, then the TEG 2 is still connected to the substrate 14 in good thermal contact and the piezo elements 11 should be able to resist a temperature of from 400 to 800 K.

In the embodiment shown, the substrate is cooled using a compact heat exchanger 18 such as a heat pipe. If the hot side of TEG 2 is connected to the substrate 14, the cold side of TEG 2 is cooled using a compact heat exchanger 18 instead of the substrate 14.

The design of FIG. 1 can also be used to connect a TIG to a TTG, by replacing the TEG with a TTG or the other generator.

Figure 2:
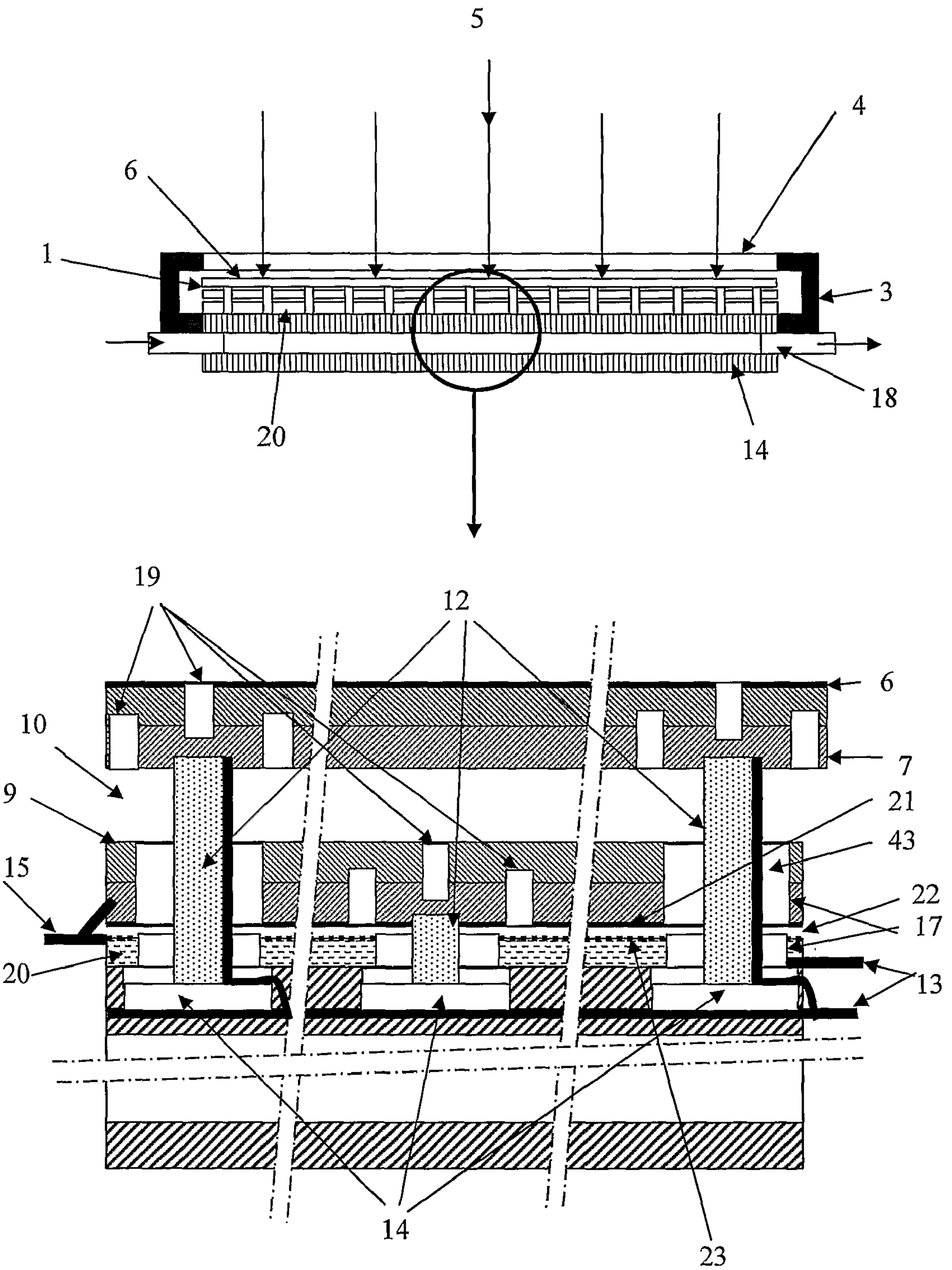
FIG. 2 is a schematic cross section of a detail of a second embodiment of an energy converter according to the present invention.

FIG. 2 shows another embodiment of an energy converter. The converter comprises a multilayered TIG 1 connected to a MTPV 20. The converter is attached in an evacuated space 13 having a cold window 4.

During use, there is radiated through the cold window 4 concentrated sunlight 5 which heats an absorber 6 attached to the outer emitter 7 to a temperature of, for example, from 1,400 to 2,000 K.

Of the multilayered TIG, one of the possible plurality of layers is shown. The emitters 7 of the layers are optionally doped with, for example, erbium in order to reduce heat radiation. Optionally, the emitters 7 are provided with a microstructure 8 (see FIG. 1) having a height of from 10 to 500 nm in order to intensify the thermionic emission.

The collectors 9 are optionally provided with a reflective layer to reflect heat radiation. This reflective layer preferably comprises, at temperatures higher than 800 K, a conductive oxide (TOC) and, at temperatures lower than 800 K, a thin layer of gold. The thickness of the layers comprising electrodes 7 and/or 9 is from one to ten micrometers and the height of the gaps 10 is from approximately 0.5 to 100 micrometers.

Grooves 19 are optionally formed in the plates comprising electrodes 7 and/or 9 in order to make the plates more resilient, thus reducing the forces acting on the spacer elements 12 during thermal deformations.

The height of the gaps 10 is optionally adjustable using piezo elements 11 which are connected to spacer elements 12. The spacer elements 12 set the layers apart. In order to avoid heat loss, the thickness of the wire-like spacer elements 12 is, to just past the outer electrode 9, one to five times the height of the gap between the electrodes 8 and then thicker, for example five to twenty times the height of the gaps.

In order to avoid heat loss, the columnar spacer elements 12 are thin and dependent on the height of the gaps between the electrodes having a diameter of from two to 100 micrometers thick. The spacer elements 12 of the outer emitter 7 are provided with a layer 43 which has good electrical conductivity and preferably poor heat conductivity and is resistant to high temperatures. The layer comprises, for example, molybdenum. The layers 43 conduct the generated current from the TIG to the current supply wires 13 and are embedded in the substrate 14 in an insulated manner. The remaining spacer elements 12 are preferably made only of a material having poor conductivity, such as oxides.

The live layers 43 are preferably connected to the emitter 7 by spot welding or by diffusion welding. On the other side, the live layers 43 are resiliently soldered or welded to the supply wires 13 and the spacer elements 12 are securely bonded or sintered to the piezo elements 11.

The insulating spacer elements are preferably connected to the remaining emitters 7 in a mortise and tenon joint by means of sintering or clamping. On the other side, the insulating spacer elements are bonded or sintered to the piezo elements 11.

The spacer elements 12 are set apart from one another by from 0.5 to 10 mm. Of each layer comprising electrodes 7 and/or 9, the height of the gap 10, the material of the electrodes 7 and/or 9 and the height of the microstructure 8 are adjusted in such a way that the output of the TIG 1 is optimal at the prevailing operational temperature. In this case, it is important that the electric current passing through the electrodes is the same in each layer.

The current of the TIG 1 is discharged at the outer collector 9, optionally combined with the current discharge or supply means 15 of the MTPV 20. The outer collector 9 of the TIG is provided, facing the MTPV 20, with a layer 22 having a high emission coefficient, so the MTPV is provided with sufficient heat radiation from the residual heat of the TIG 1. The gap 21 between the TIG 1 and the MTPV 20 has a height of from fifty to two hundred nm and serves to conduct the heat radiation, intensified by resonance, to the MTPV 20.

Formed in the electrodes 7 and/or 9 and the MTPV 20 are holes through which the spacer elements 12 of the outside layers 7 and/or 9 protrude. If the spacer elements are live, the holes are provided with an insulation layer 17. The insulation layer 17 is, for example, obtained by oxidation or an attached oxide. The small holes in the electrodes 7 and/or 9 and in the electrodes of the MTPV 20 are formed by etching or using a laser. In the illustrated embodiment, the substrate is cooled using a compact heat exchanger 18 such as a heat pipe.

In another embodiment, the radiation emitter 21 is at the same time a thermionic emitter through which the MTPV 20 at the same time functions as a TIG by making the radiation emitter 22 from a material having the correct composition and by providing the correct surface structure to operate, at the prevailing operational temperature, with an optimum output as TIG 1 and MTPV 20. The current-discharging grid 23 and the electrode 9, facing the emitter 7 of the TIG 1, of the MTPV 20 is then also the collector 9 of this simultaneous MTPV 20 and TIG 1, and the electrical contact of the collector 9 with the feed-through means 15 is dispensed with. With this option, not only is the output higher, the power capacity is also increased, and this is advantageous in material usage and for better output of the multilayered TIG 2.

Figure 3:
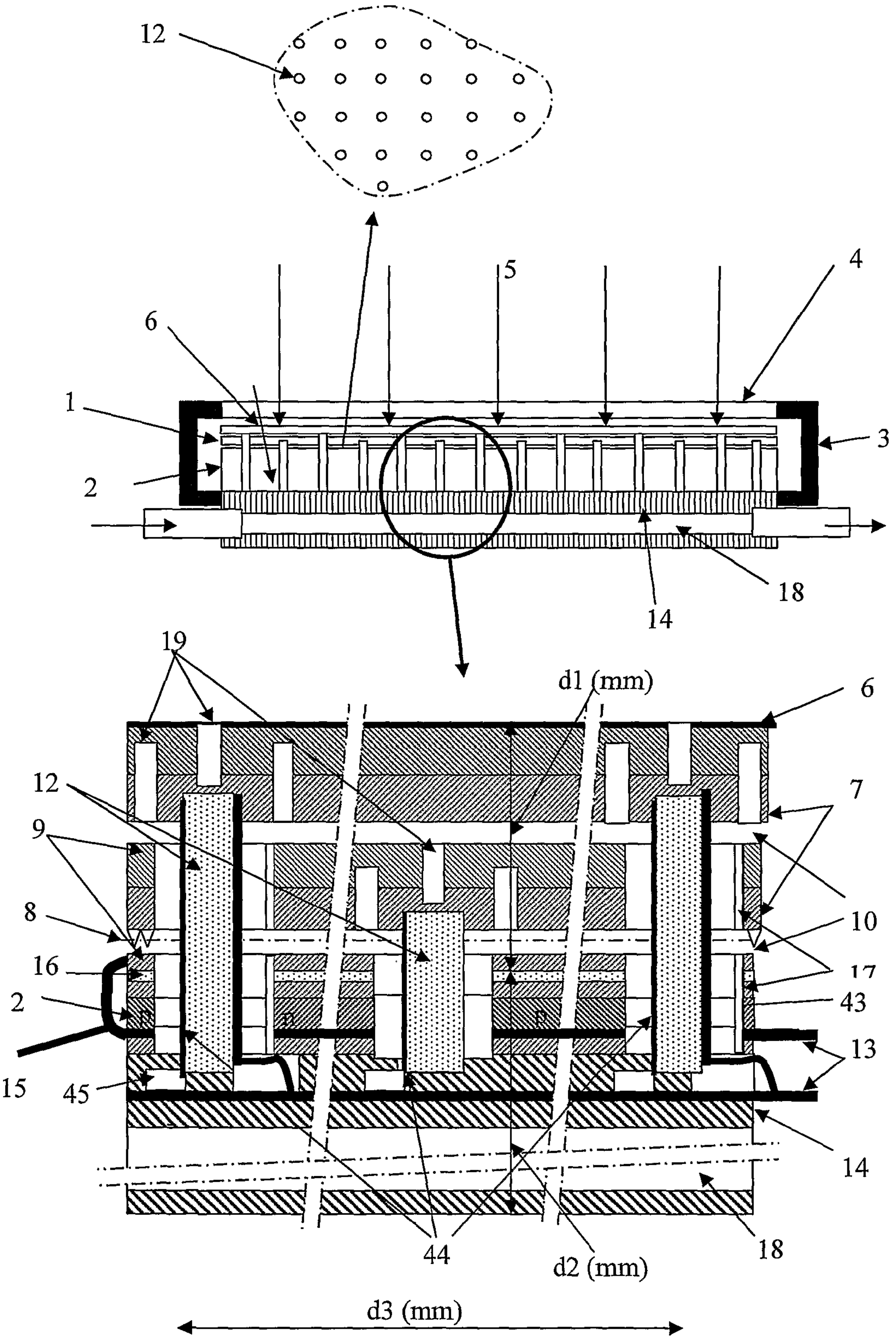
FIG. 3 is a schematic cross section of a detail of a third embodiment of a connected energy converter according to the present invention.

FIG. 3 shows an alternative adjustment of the gaps 10. The length of the spacer elements 12 is adjusted with the temperature of the spacer elements 12 on account of the thermal expansion resulting therefrom. For this purpose, layers 44 are attached to the spacer elements 12, as a result of which there is conveyed a current which heats the spacer elements 12 to the desired temperature. The current is regulated by a schematically illustrated regulator 45 which is in fact attached to an integrated circuit (not shown) in the region of the spacer elements 12 in combination with the regulators 45 of the other spacer elements 12. Each resistance layer 44 is in this case connected to the circuit via separate electrically insulated current supply wires (not shown). The regulator 45 operates, for example, in accordance with what is known as the fuzzy-logic principle, in which there is activated periodically and sequentially, in each spacer element 12 separately, a very small change in length from which a new and better adjustment for all of the spacer elements 12 is subsequently calculated, from the response in the total energy generated, and activated by a programmed processor present in the integrated circuit. This regulation can optionally also be used in the option with piezo elements in FIG. 2 and FIG. 3.

Figure 4:
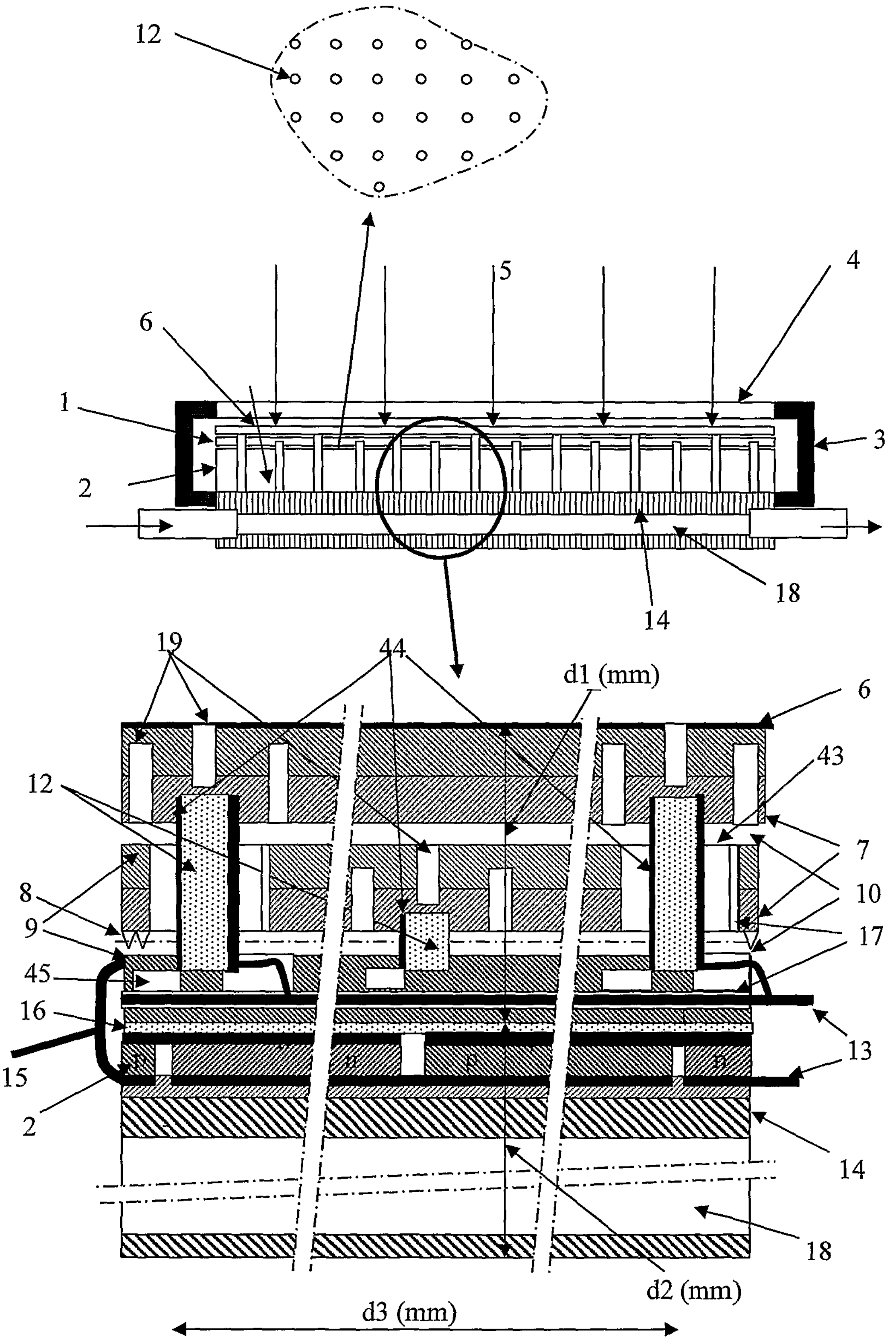
FIG. 4 is a schematic cross section of a detail of a fourth embodiment of a connected energy converter according to the present invention.

FIG. 4 shows an alternative spacing regulation in which the spacing is regulated from the electrical converter 2 connected to the TIG 1, in this example the TEG 2. In this case, no holes are drilled in the TEG 2. Because the cold sides of the spacer elements 12 are now approx. 900 K, the length of the spacer elements 12 will preferably be used, their temperature regulated by the regulator from FIG. 3. In this case too, use is made of an electronic circuit (not shown) which regulates the current passing through the resistance layers 44 and which is positioned at a cool location in the region of the converter, the resistance layers 44 each being separately connected using thin live wires (not shown).

Figure 5:
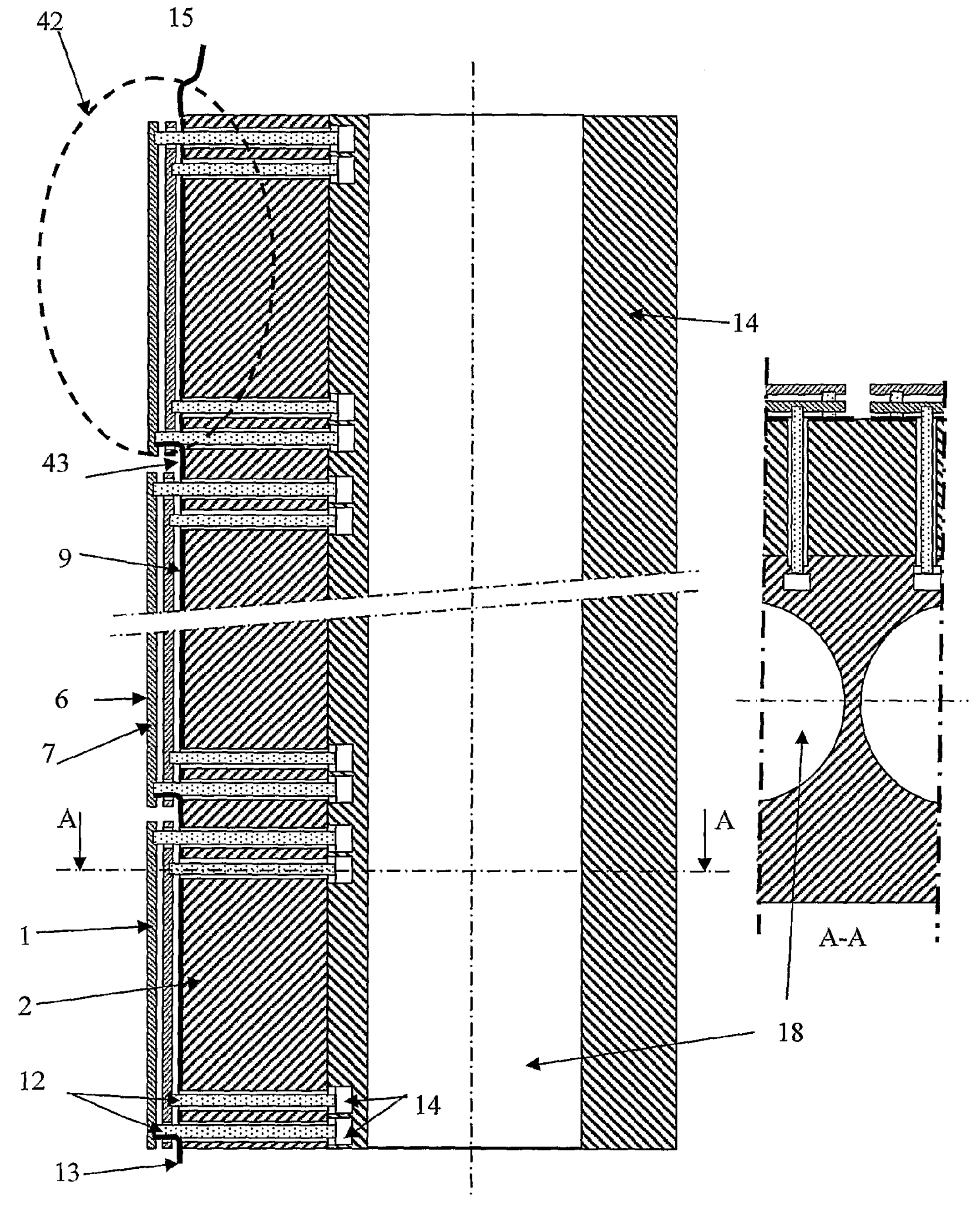
FIG. 5 is a schematic cross section of a fifth embodiment of an energy converter according to the present invention.

FIG. 5 shows an embodiment of one of the above-mentioned energy converters, the TIG 1 being divided, thermally parallel, into relatively small squares 42 or other flat shapes (relatively small parts) and these relatively small parts being electrically connected in series. Each part 42 is in this case from 0.1 to 10 mm in size and consists, again, of a single-layered or multilayered TIG 1, the relatively small parts 42 being thermally connected in series with a generator operating at a lower temperature, in this case a TEG 2.

Each part 42 has, for each electrode plate 7 and/or 9, three or more spacer elements 12 which are, again, preferably provided with a piezo element 14. The current is in this case conveyed using an electrical conductor 13 along the outer spacer element, from one of the outer small parts 42 to the outer emitter 7 of the TIG 1. Each part 42 is electrically connected in series with one adjacent part by connecting the outer collector 9 of that part 42 comprising an electrical conductor 43 to the outer emitter 7 along the closest spacer elements 12 of the adjacent part 42. This is carried out just until all of the parts 42 are connected and positioned electrically in series. The current is then conveyed from the last small part 42 connected in series outward using a conductor 15 from its collector 9. The remaining functions are as in FIGS. 1, 2, 3 and 4.

In another embodiment, one row of relatively small parts 42 is, depending on the desired tension, electrically in series and the other rows are, again, in parallel. Depending on the desired tension, other parallel or series connections are also possible.

Figure 6:
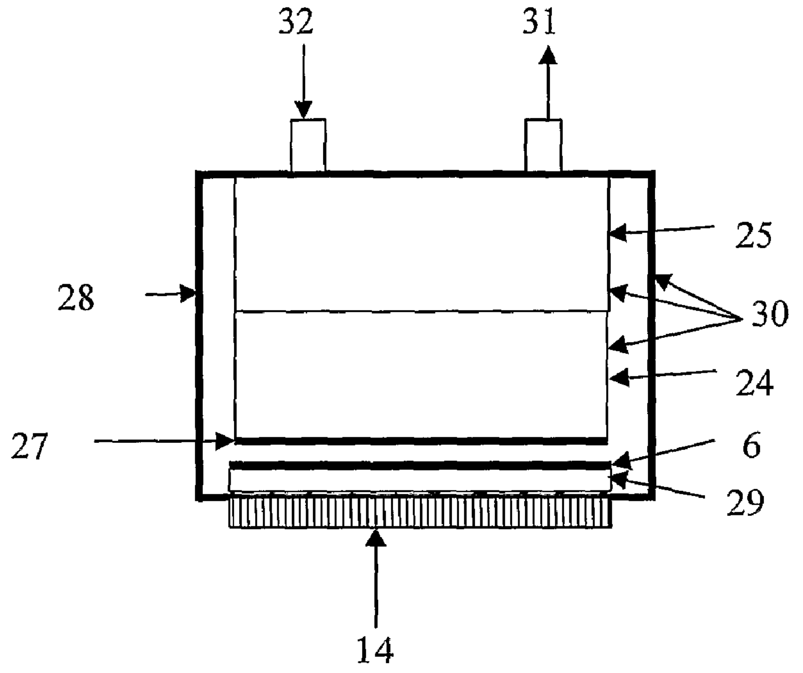
FIG. 6 is a schematic cross section of a sixth embodiment of an energy converter according to the present invention.

FIG. 6 shows an embodiment of the energy converter 29, wherein the heat from a burner 24 is radiated in a contactless manner by a radiation emitter 27 onto the absorber 6 of the outer emitter 7 of the TIG 1 from FIGS. 1, 2, 3, 4 and 5.

The burner 24 comprising a recuperator 25, with which the residual heat in the outlet gases 31 from the burner 24 is used to preheat the inlet gases 32, heats a radiation emitter 27. The assembly as a whole is placed in the vacuum space 28 in a vacuum-tight manner. The walls 30 of the vacuum space 28 are provided with a layer having a very low emission coefficient such as reflective aluminium, silver or gold.

Figure 7:
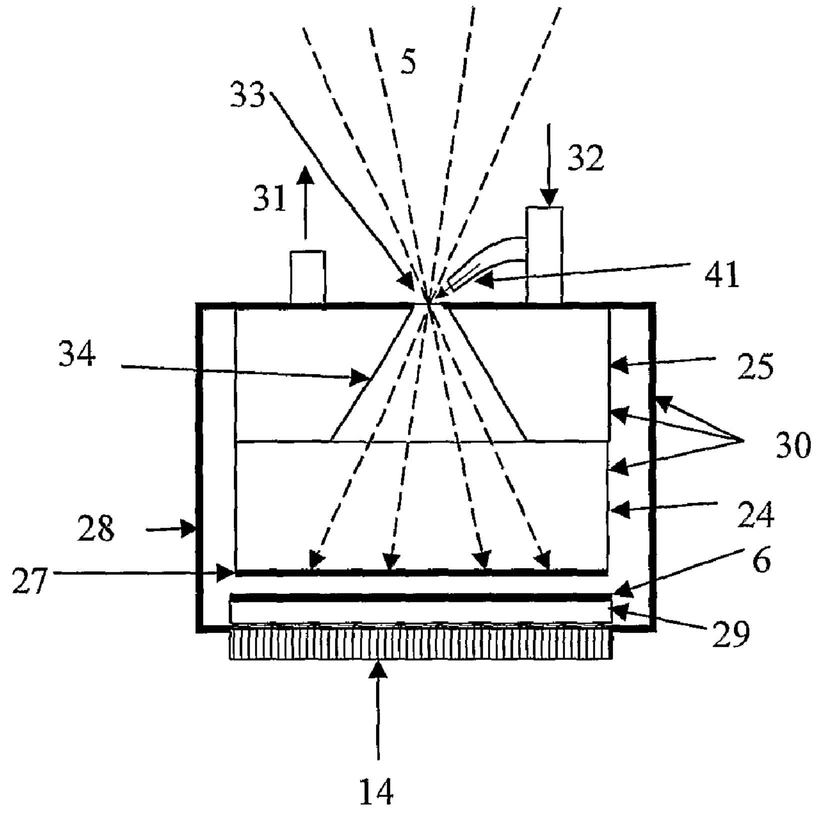
FIG. 7 is a diagram of an application of an energy converter according to the present invention.

FIG. 7 shows an embodiment of an extension of the energy converter according to FIG. 1, 2, 3 or 4, wherein both the heat from a burner 24 and the heat of concentrated sunlight are radiated in a contactless manner by a radiation emitter 27 onto the absorber 6 of the outer emitter 7 of the TIG 1 from FIGS. 1 and 2.

Depending on the availability of sunlight and the demand for energy, the heat from concentrated sunlight 5 and/or the heat from the burner 24 is used to heat a radiation emitter 27. With a recuperator 25, the residual heat in the outlet gases 31 from the burner 24 is used to preheat the inlet gases 32. The burner 24 and recuperator 25 are attached in the vacuum space 28, together with the converter 29, in a vacuum-tight manner. All of the walls 30 of the vacuum space 28 are provided with a layer having a very low emission coefficient such as reflective aluminium, silver or gold.

In order to restrict outward heat and radiation losses, the sunlight radiates through a transparent, funnel-shaped, hollow, evacuated space 34 of dehydrated quartz, aluminium garnet or another heat-resistant, transparent material. The focal point 33 of the concentrated sunlight is located in the tip of the funnel 34. The tip of the funnel 34 has a diameter which is somewhat larger than the diameter of the focal point 33.

Depending on the demand for electricity and the availability of the sun, the burner 24 is adjusted to ensure at all times the supply of energy and to ensure that as the amount of sunlight decreases, the sunlight can dispense its heat at a high temperature. This latter aspect is beneficial for the output of the energy converter.

In another embodiment, the funnel 34 is an open space into which a small portion of the inlet air 41 is injected. The injected air thus generates an insulating heat curtain.

Figure 8:
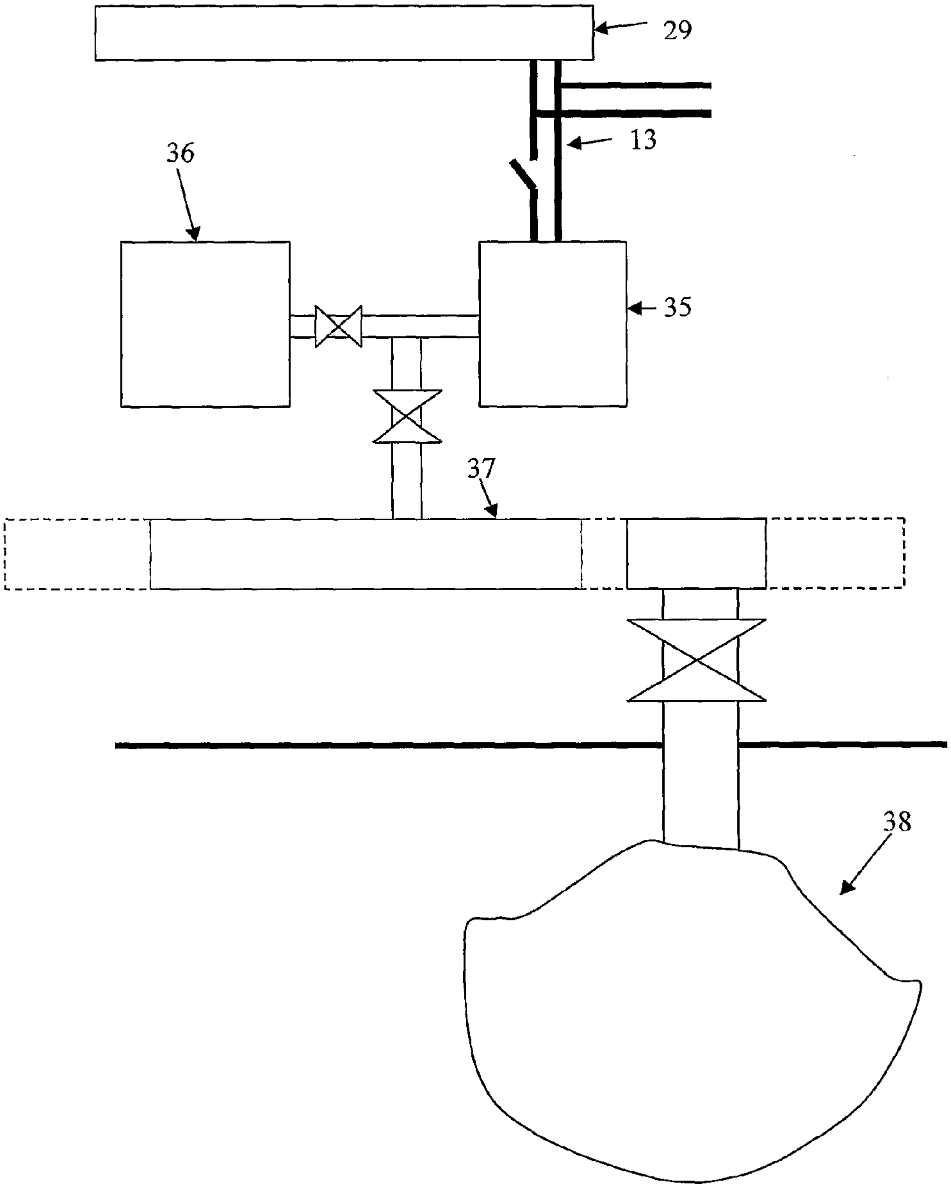
FIG. 8 is a diagram of a second application of an energy converter according to the present invention.

FIG. 8 shows an embodiment of an extension of an energy converter shown in FIGS. 1, 2, 3, 4 and/or 5, in which electrical energy is converted into a combustible gas whenever the availability of the sun is higher than the demand for electrical energy.

The remaining electrical energy from the energy converter 29 is converted into a combustible gas, preferably hydrogen, using an electrolysis apparatus 35. Subsequently, the combustible gas is stored in a tank 36 or returned to a gas supply network 37 comprising a storage facility, or to an old gas field 38. If subsequently there is, again, too little sunlight, then the burner of the embodiment from FIGS. 6 and/or 7 will, again, use this gas to supply electricity.

Figure 9:
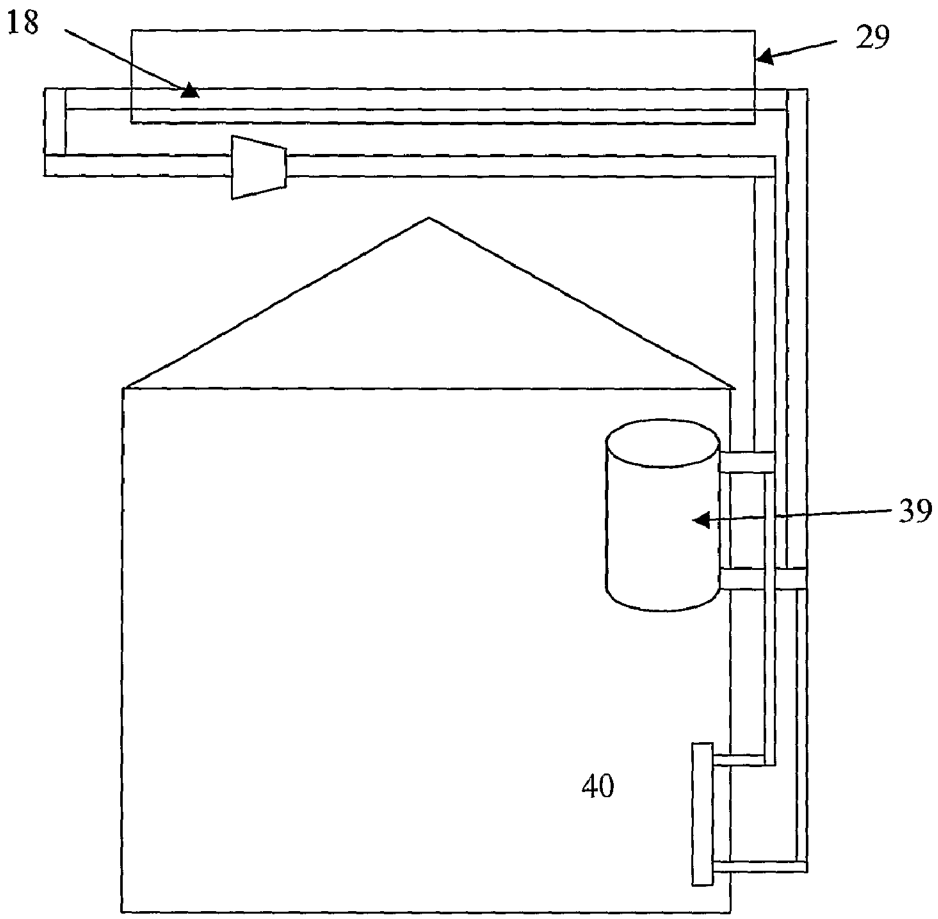
FIG. 9 is a diagram of a third application of an energy converter according to the present invention.

FIG. 9 shows an embodiment of an extension of an energy converter shown in FIGS. 1, 3, 4, 5, 6 and/or 7, in which residual heat from the cooling means 18 is stored in a boiler 39 or is used immediately in a radiator 40 for heating spaces.

Figure 10:
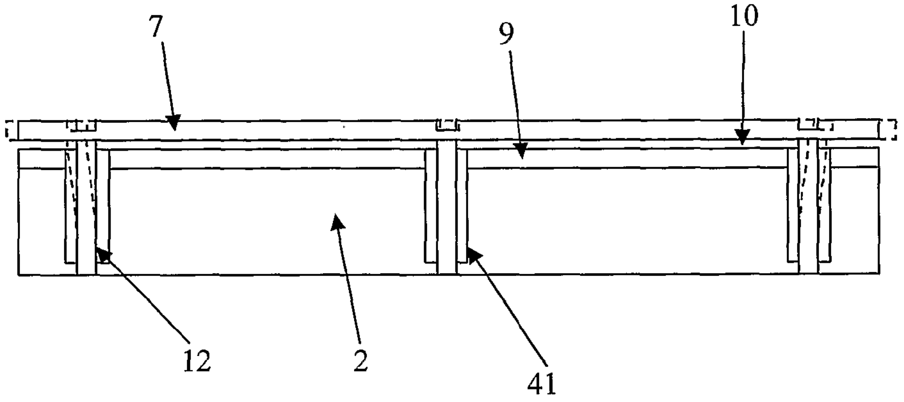
FIG. 10 is a cross section of the present invention, illustrating the selectively flexible function.

FIG. 10 shows the selectively flexible operation of the spacer elements 12 of the energy converter according to the present invention, in which the spacer elements 12 are connected, on one side, to the emitter 7 of the TIG and, on the other side, in (blind) holes on and in the connected generator 2. On account of the (blind) holes 41, the spacer elements 12 may be much longer than the slot height of the gap 10 and are thus slim and laterally selectively flexible by bending and also form in this case high thermal resistance in order to minimise parasitic losses from the hot emitter 7 to the colder collector 9. The emitter 7 is able to expand with low mechanical stresses as a result of the fact that the slim spacer elements 12 are able to bend resiliently and selectively flexibly, as is indicated by a broken line, with likewise low mechanical stresses, whereas the generator 2, which is connected to the TIG and connected to the collector 9 of the TIG, also experiences low loads. As a result of the fact that the collector 9 also has approximately the same temperature as the part of the connected generator 2 to which it is connected, there will occur at this location too only low thermal loads no greater than the loads for which the generator 2 was originally designed when not connected. As a result of the fact that the spacer elements 12 are axially rigid, the slot height of the gap 10 will hardly change and the slot height of the gap 10 remains uniform and precisely at the value required for a high output, in the case of thermal expansion or other deformation of the emitter 7 or of the connected generator 2.

Figure 11:
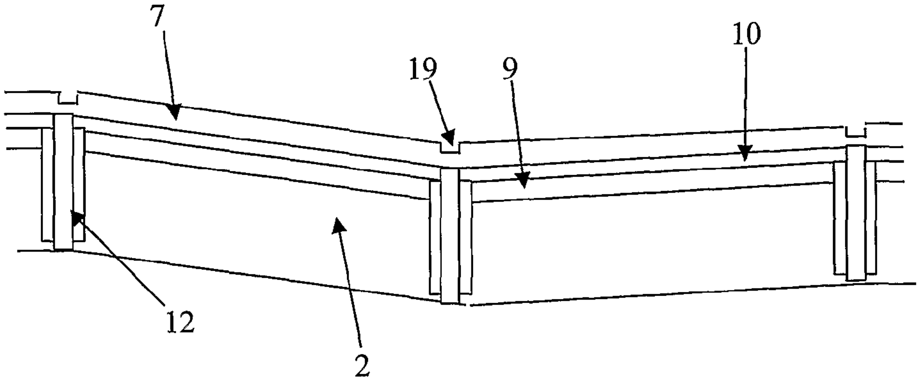
FIG. 11 is a cross section of the present invention, illustrating the selectively flexible function.

FIG. 11 shows the selectively flexible operation of the spacer elements 12 and the emitter 7 of the energy converter according to the present invention, in which the spacer elements 12 are connected, on one side, to the emitter 7 of the TIG and, on the other side, in (blind) holes on and in the connected generator 2. On account of the (blind) holes 41, the spacer elements 12 may be much longer than the slot height of the gap 10 and are thus slim and laterally selectively flexible and also form in this case high thermal resistance in order to minimise parasitic losses from the hot emitter 7 to the colder collector 9. The emitter 7 is able to follow, with low mechanical stresses, any deformations of the connected generator 2 as a result of the fact that the slim spacer elements 12 and the grooves 19 in the emitter 7 are able to bend in a laterally selectively flexible manner, as is indicated by a kink in the connected generator 2, with likewise low mechanical stresses, wherein the likewise resilient collector of the TIG, which is securely connected to the connected generator 2 over its entire surface, will also effectively follow the connected generator 2. As a result of the fact that the spacer elements 12 are axially rigid, the slot height of the gap 10 will hardly change and the slot height of the gap 10 remains uniform and precisely at the value required for a high output, in the case of any deformation of the connected generator 2 or of the emitter 7.

In a practical configuration of one or more of the above-described embodiments, the distances d1, d2 and/or d3 indicated in FIGS. 1-4 are of the order of magnitude of from 0.1 to 15 mm. Preferably, d1 is from approximately 0.01 to 0.1 mm, for example 0.03 to 0.06 mm. D2 is from approximately 1 to 15 mm, for example approximately 2 to 10 mm. Preferably, D3 is from approximately 0.1 to 10 mm, for example approximately 0.2 to 4 mm. The spacer elements preferably have a length which is from 5 to 20 times the slot height of the gap between the electrodes of the TIG, whereas the diameter of the spacer elements is preferably 5 to 10 times smaller than the length of the spacer elements and the stretch between the spacer elements, such that the average surface area is 0.05% of the total average surface area of the TIG.

The present invention is not limited to the above-described embodiments thereof, to which a large number of alterations and modifications are conceivable within the scope of the appended claims. All of the above-described embodiments may also be used in combination or linked together.

The invention claimed is:

1. An energy converter comprising:

a thermionic generator (TIG) for converting heat from a heat source into electrical energy, comprising:

a number of electrodes which are attached with a gap relative to one another;

selectively flexible spacer elements which are each connected to at least one of the electrodes for keeping the gaps between the electrodes at a desired distance; and at least one generator without moving parts which is directly connected to the thermionic generator having selectively flexible spacer elements for converting residual heat from the thermionic generator into electrical energy;

wherein the TIG comprises a plurality of layers of electrodes connected in series, wherein each layer comprises two electrodes attached with one of the gaps relative to each other, of which one electrode is a collector and the other electrode an emitter.

2. The energy converter according to claim 1, wherein one or more of the spacer elements are provided with an electrically conductive layer for producing an electrical connection to an outer electrode, i.e. emitter, of the TIG.

3. The energy converter according to claim 1, further comprising a substrate to which the generator without moving parts and the thermionic generator are attached, wherein there are attached to the substrate piezo elements which are connected to the spacer elements connected to one or more of electrodes for adjusting the gap between the electrodes.

4. The energy converter according to claim 3, wherein there is attached to the spacer elements an electrical resistance layer with which the temperature, and thus the length of the spacer elements, can be adjusted for precisely adjusting the gap between the electrodes.

5. The energy converter according to claim 3, wherein the spacer elements comprise electrically conductive spacer elements and electrically insulating spacer elements.

6. The energy converter according to claim 5, wherein the conductive spacer elements are connected at one end to an outer electrode of the thermionic generator (TIG) and at an opposing end to current supply wires in the substrate.

7. The energy converter according to claim 5, wherein the conductive spacer elements are connected at one end to an outer electrode of the thermionic generator and at an opposing end to current supply wires in the warm side of the energy converter connected to the thermionic generator.

8. The energy converter according to claim 5, wherein the insulating spacer elements are connected at one end to one of the emitters of the thermionic generator and at an opposing end to one of the piezo elements.

9. The energy converter according to claim 5, wherein the insulating spacer elements are connected at one end to one of the emitters of the thermionic generator and at an opposing end to the substrate.

10. The energy converter according to claim 5, wherein the insulating spacer elements are connected at one end to one of the emitters of the thermionic generator and on the other side to the warm side of the energy converter connected to the thermionic generator.

11. The energy converter according to claim 1, wherein the thermionic generator is split into components and wherein the components are electrically connected in series and wherein there are present at least three conductive spacer elements per component and three insulating to provide clarity with respect to the intermediate layer.

12. The energy converter according to claim 1, further comprising a vacuum-tight housing which is attached around the generator without moving parts.

13. The energy converter according to claim 12, wherein an inner surface of the housing is at least partially provided with a reflective layer.

14. The energy converter according to claim 12, wherein the housing is provided with a cold window for heating with concentrated light an emitter, located closest to the cold window, of the thermionic generator, a focal point of the concentrated light being located in the cold window.

15. The energy converter according to claim 14, wherein the electrode located closest to the cold window is provided with an absorber layer.

16. The energy converter according to claim 12, wherein the housing can be evacuated via gas pipes coupled thereto.

17. The energy converter according to claim 12, wherein walls of the housing are provided with a layer comprising a material having a low emission coefficient.

18. The energy converter according to claim 17, wherein the material is aluminium, silver or gold or is provided with a thin layer of silver or gold.

19. The energy converter according to claim 1, wherein the emitter is doped to reduce heat radiation.

20. The energy converter according to claim 1, wherein the emitter is provided with a microstructure for reinforcing the thermionic emission.

21. The energy converter according to claim 20, wherein the microstructure comprises protuberances having a height of from approximately 10 to 500 nm.

22. The energy converter according to claim 1, wherein the collector is provided with an at least partially reflective layer.

23. The energy converter according to claim 22, wherein the reflective layer comprises a conductive oxide and/or gold.

24. The energy converter according to claim 1, wherein the electrodes of the TIG are provided with selectively flexible grooves.

25. The energy converter according to claim 3, wherein the substrate is coupled to a heat exchanger.

26. The energy converter according to claim 3, wherein the substrate is provided internally with one or more hollow spaces.

27. The energy converter according to claim 26, wherein the hollow spaces are connected to feed and discharge pipes with vacuum-tightness of from approximately $10^{-5}$ to $10^{-7}$ torrl/s.

28. The energy converter according to claim 1, further comprising a burner which is provided in proximity to the thermionic generator with a radiation emitter.

29. The energy converter according to claim 28, wherein the burner is coupled to a recuperator for the preheating of inlet gases with the heat of outlet gases from the burner.

30. The energy converter according to claim 29, wherein the recuperator comprises a transparent light opening for the passage of concentrated sunlight to the radiation emitter of the burner, a focal point of the concentrated sunlight being located in the transparent light opening.

31. The energy converter according to claim 30, further comprising means for introducing into the light opening a portion of the inlet air from the burner in order to act as a heat curtain.

32. The energy converter according to claim 30, further comprising an electrolysis apparatus for the conversion of unused electrical energy from solar heat into hydrogen and the storing thereof in a storage vessel for the reconversion thereof into electrical energy at a later point in time by the burner of the energy converter.

33. The energy converter according to claim 30, further comprising an electrolysis apparatus for converting unused electrical energy from solar heat into hydrogen, for returning the hydrogen to a gas supply network from which the burner obtains its fuel.

34. The energy converter according to claim 1, further comprising a boiler or a space for the heating thereof with residual heat from the substrate of the converter.

35. A generator provided with at least one energy converter according to claim 1.

* * * * *